US012747087B2

(12) United States Patent
Bolek et al.

(10) Patent No.: US 12,747,087 B2
(45) Date of Patent: Sep. 29, 2026

(54) CONTAINER FOR PACKAGE

(71) Applicant: BERRY GLOBAL, INC., Evansville, IN (US)

(72) Inventors: Christopher M. Bolek, Evansville, IN (US); Jonathan Eickhoff, Evansville, IN (US); Roy E. Ackerman, Evansville, IN (US); Adam Schneider, Evansville, IN (US)

(73) Assignee: BERRY GLOBAL, INC., Evansville, IN (US)

(*) Notice: Subject to any disclaimer, the term of this patent is extended or adjusted under 35 U.S.C. 154(b) by 13 days.

(21) Appl. No.: 18/654,518

(22) Filed: May 3, 2024

(65) Prior Publication Data

US 2024/0367886 A1 Nov. 7, 2024

Related U.S. Application Data

(60) Provisional application No. 63/464,327, filed on May 5, 2023.

(51) Int. Cl.

*B65D 81/38* (2006.01)
*B29C 51/00* (2006.01)
*B29C 51/02* (2006.01)
*B29C 51/14* (2006.01)
*B65D 21/02* (2006.01)
*B29K 23/00* (2006.01)
*B29L 31/00* (2006.01)

(52) U.S. Cl.

CPC ........ *B65D 81/3823* (2013.01); *B29C 51/002* (2013.01); *B29C 51/02* (2013.01); *B29C 51/14* (2013.01); *B65D 21/0233* (2013.01); *B65D 81/3816* (2013.01); *B29K 2023/12* (2013.01); *B29L 2031/712* (2013.01)

(58) Field of Classification Search

CPC ................ B65D 81/38; B65D 81/3804; B65D 81/3813; B65D 81/3816; B65D 81/3823; B65D 81/3837; B65D 81/3865; B65D 81/3876; B65D 81/3879

USPC ............................ 220/592.2, 592.24, 592.25

See application file for complete search history.

(56) References Cited

U.S. PATENT DOCUMENTS 3,931,385 A 1/1976 Sutch
3,931,908 A 1/1976 Cheyney
(Continued)

FOREIGN PATENT DOCUMENTS

CA 2499766 C 1/2007
EP 0481090 A1 4/1992
(Continued)

OTHER PUBLICATIONS

Mexican Office Action in counterpart Mexican App. No. MX/a/2022/013077 dated Jul. 24, 2025, English translation included, 8 pages.
European Search Report for for counterpart European App. No. 21720162.3 dated Aug. 22, 2025, 12 pages.
Intemational Search Report and Written Opinion for PCT/EP2021/060139 dated Aug. 11, 2021.
International Search Report and Written Opinion for PCT/EP2020/074254 dated Feb. 9, 2021.
(Continued)

*Primary Examiner* — Robert Poon
(74) *Attorney, Agent, or Firm* — Barnes & Thornburg LLP

(57) ABSTRACT

An insulative container includes a container-support frame and a container shell coupled to the container-support frame. A method of forming the insulative container includes forming the container-support frame and the container shell. The container-support frame and the container shell include polymeric materials.

10 Claims, 4 Drawing Sheets

(56) References Cited

U.S. PATENT DOCUMENTS

| | | | | |
|---|---|---|---|---|
| 4,001,471 | A | 1/1977 | Rumball | |
| 4,020,140 | A | 4/1977 | Rumball | |
| 4,123,214 | A | 10/1978 | Sutch | |
| 4,993,623 | A | 2/1991 | Kelly | |
| 7,481,356 | B2 | 1/2009 | Stahlecker | |
| 7,665,627 | B2 | 2/2010 | Shibata | |
| 9,302,832 | B2 | 4/2016 | Park | |
| 10,589,890 | B2 | 3/2020 | Nille | |
| 2001/0038014 | A1 | 11/2001 | Donelson | |
| 2003/0106895 | A1 | 6/2003 | Kalal | |
| 2004/0013830 | A1 * | 1/2004 | Nonomura | D21J 5/00 162/267 |
| 2009/0220711 | A1 | 9/2009 | Chang | |
| 2010/0230424 | A1 | 9/2010 | Bartlett | |
| 2012/0261464 | A1 | 10/2012 | Hung | |
| 2014/0353202 | A1 | 12/2014 | Park | |
| 2015/0342380 | A1 * | 12/2015 | Letica | A47G 19/2288 229/403 |
| 2021/0120988 | A1 | 4/2021 | Leser | |
| 2021/0245914 | A1 * | 8/2021 | Eickhoff | B65D 1/34 |
| 2021/0261464 | A1 | 8/2021 | Kerr | |
| 2022/0127068 | A1 * | 4/2022 | Eickhoff | B65D 85/8043 |
| 2024/0116665 | A1 * | 4/2024 | Lehner | B65D 1/42 |

FOREIGN PATENT DOCUMENTS

| | | | |
|---|---|---|---|
| EP | 1650134 | A2 | 4/2006 |
| EP | 2213350 | A2 | 8/2010 |
| EP | 2420374 | | 2/2012 |
| GB | 1348370 | | 3/1974 |
| JP | 60193865 | A | 10/1985 |
| JP | H1058482 | A | 3/1998 |
| WO | 2011131653 | A1 | 10/2011 |
| WO | 2021214002 | A1 | 10/2021 |

OTHER PUBLICATIONS

International Preliminary Report on Patentability for PCT/EP2020/074254 dated Jul. 12, 2022.

Office Action (Non-Final Rejection) dated Feb. 26, 2024 for U.S. Appl. No. 17/919,795 (pp. 1-9).

International (PCT) Search Report for International (PCT) App. No. PCT/US2024/027707 dated Sep. 9, 2024, BP-611 PCT || 16 pages.

Office Action (Final Rejection) dated Aug. 22, 2024 for U.S. Appl. No. 17/919,792 (pp. 1-8).

* cited by examiner

CONTAINER FOR PACKAGE

PRIORITY CLAIM

This application claims priority under 35 U.S.C. § 119 (e) to U.S. Provisional Patent Application No. 63/464,327, filed May 5, 2023, which is expressly incorporated by reference herein in its entirety.

BACKGROUND

The present disclosure relates to packages, and particularly to containers. More particularly, the present disclosure relates to polymeric containers.

SUMMARY

According to the present disclosure, an insulative container includes a container-support frame and a container shell coupled to the container-support frame. The container-support frame is configured to reinforce the container shell while the container shell provides insulation for the insulative container.

In illustrative embodiments, the container-support frame defines an interior product storage space and includes a brim, a floor spaced apart from the brim, and a sidewall interconnecting the brim and the floor. The brim defines an open mouth opening into the product storage space. The floor closes a lower end of the insulative container to provide a bottom of the interior product storage space. The sidewall extends between and interconnects the brim and the floor to define the interior product storage space above the floor and inward of the sidewall.

In illustrative embodiments, the container shell is configured to bond with an outer surface of the sidewall to reside vertically between the brim and the floor. The container shell is formed with the container-support frame during an in-mold labeling process to provide an attachment interface between container shell and the sidewall of the container-support frame from a lower edge of the container shell to an upper edge of the container shell.

In illustrative embodiments, the container-support frame includes a first polymeric formulation and a first density. The container shell includes a second polymeric formulation having a second density less than the first density.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of an insulative container, in accordance with the present disclosure, including a container-support frame configured to increase a rigidity of the insulative container and a container shell configured to increase thermal insulation of the container, and showing portions of the container shell removed to expose a portion of the container-support frame, as shown in FIG. 3;

Figure 7:
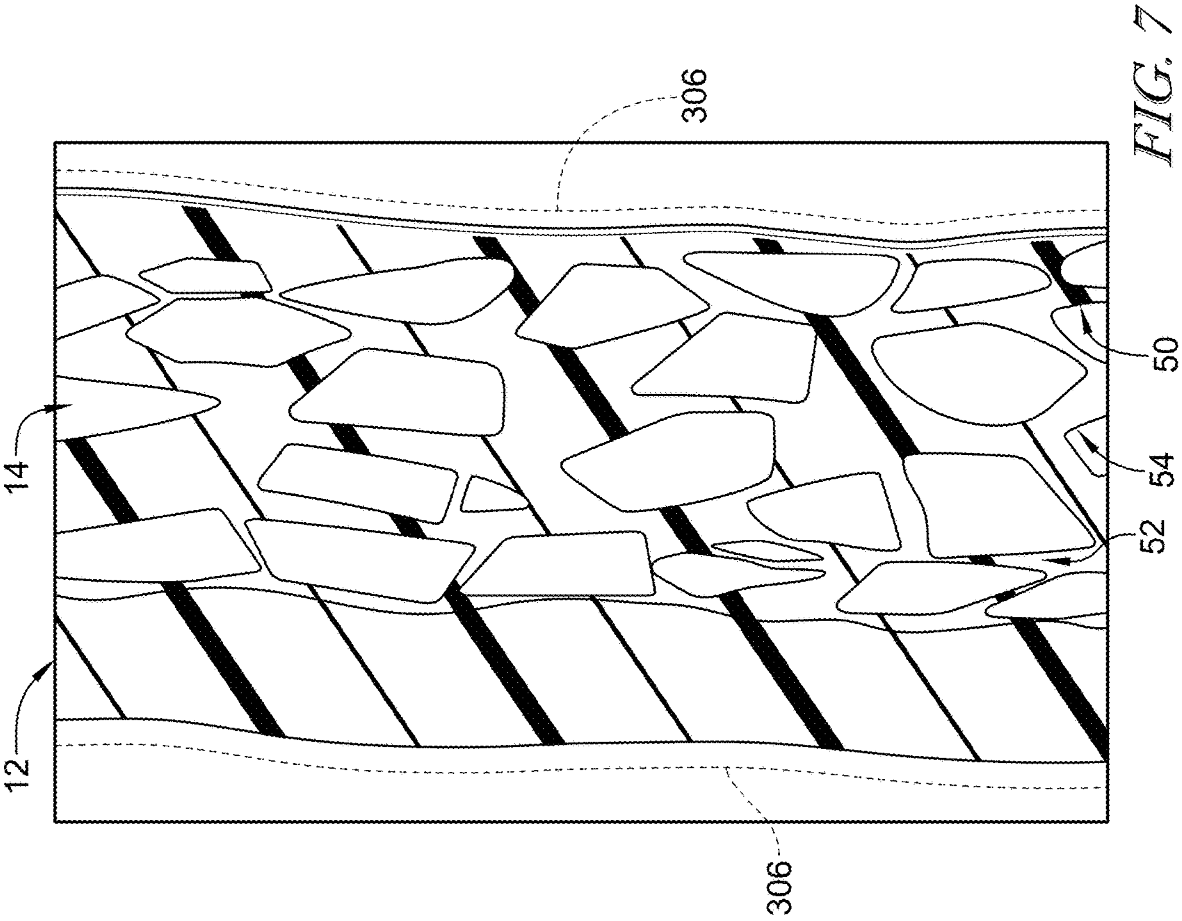
Figure 6:
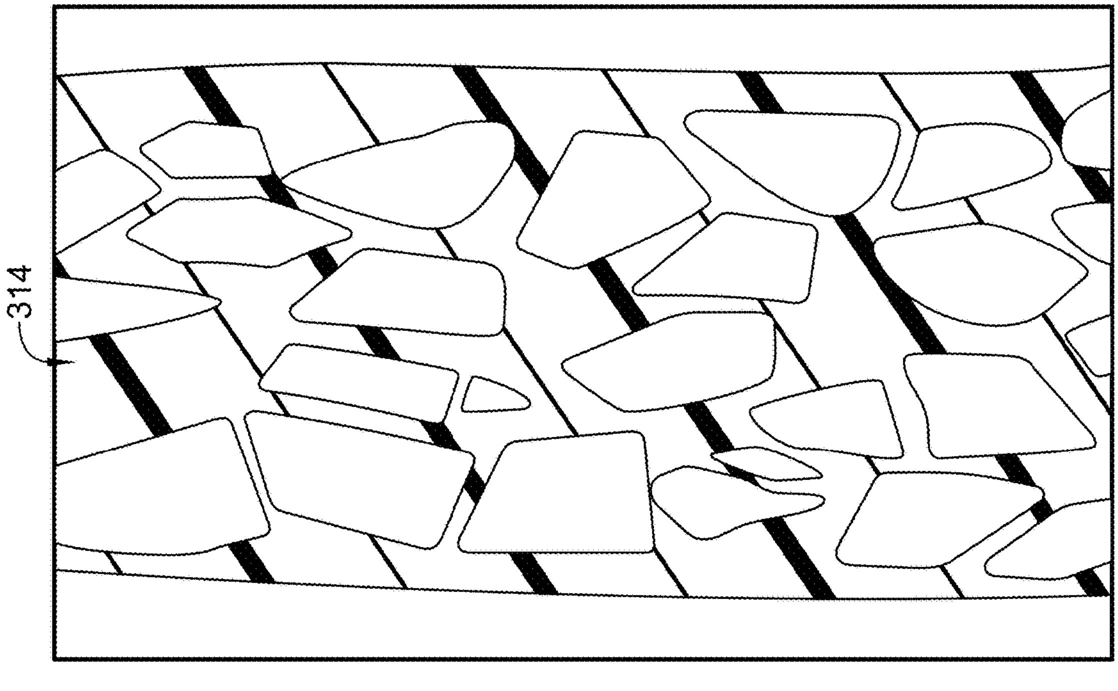

FIG. 6 is a cross section of a shell preform prior to bonding with the container-support frame during the in-mold labeling process to form the container shell of the container after the in-mold labeling process as shown in FIG. 7; and FIG. 7 is a cross section of the insulative container after the in-mold labeling process showing that the container shell compresses in thickness from an initial thickness of the shell preform prior to the in-mold labeling process.

DETAILED DESCRIPTION

Figure 1:
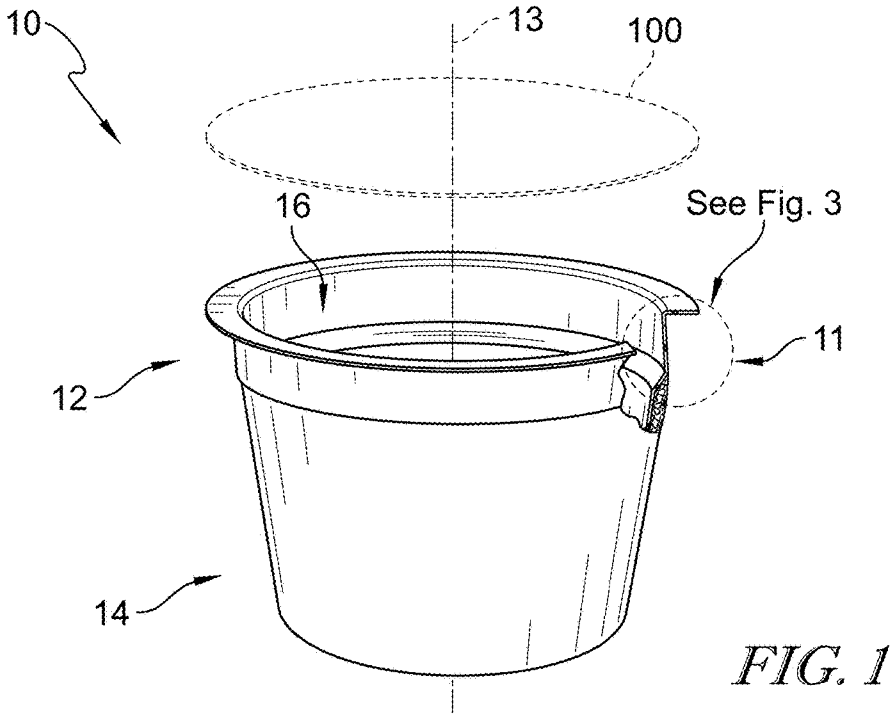
Figure 2:
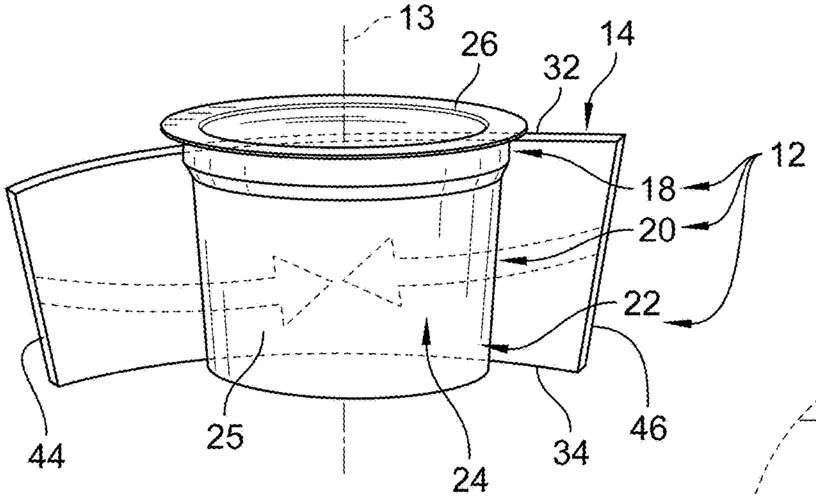
FIG. 2 is a perspective view of the insulative container from FIG. 1 with the container shell removed to show that the container-support frame includes a brim, a floor spaced apart from the brim, and a sidewall interconnecting the brim and the floor and configured to bond with and support the container shell during an in-mold labeling process, as shown in FIG. 5.
Figure 5:
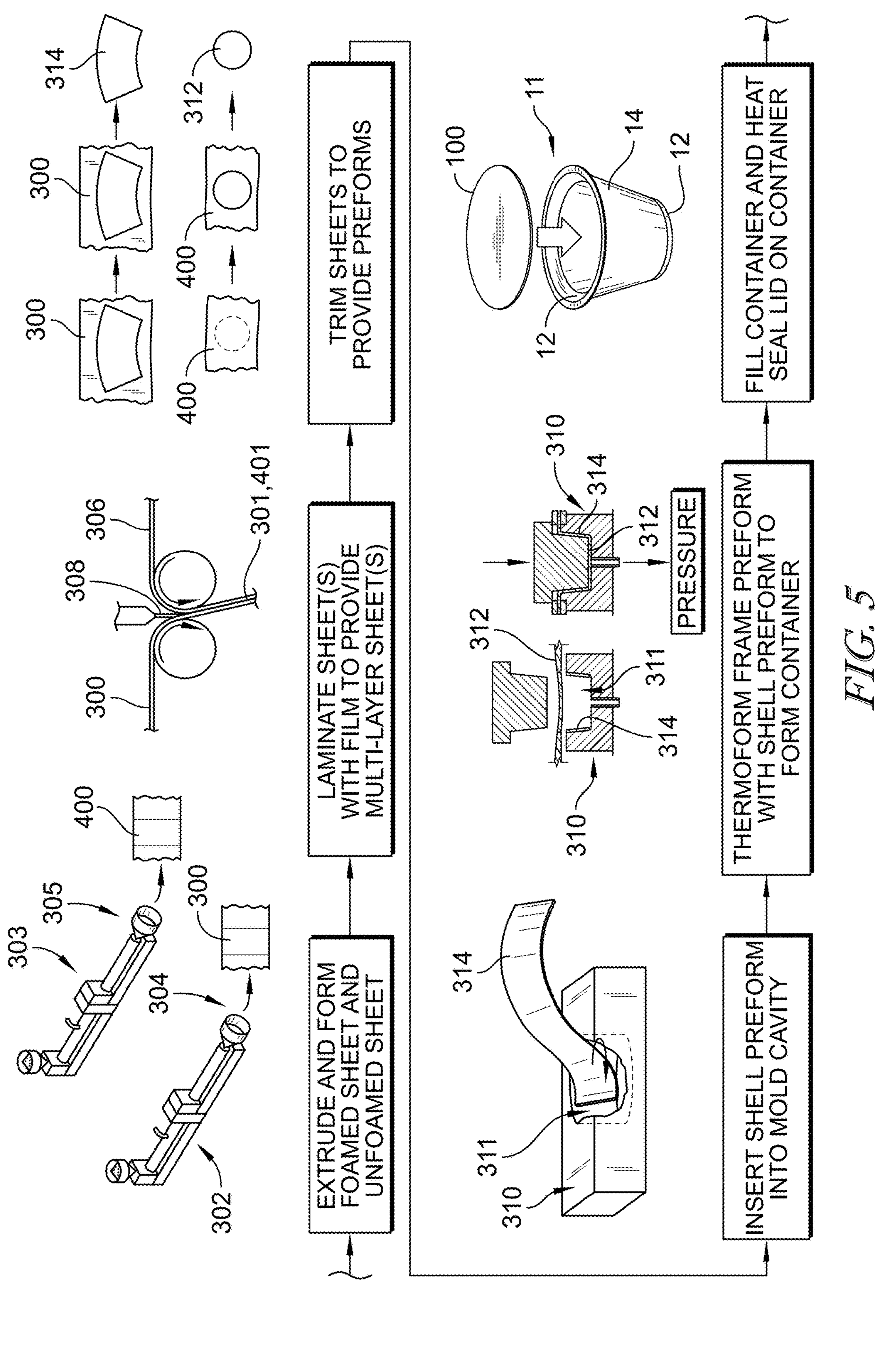
FIG. 5 is a diagrammatic flowchart showing the in-mold labeling process by which the insulative container is formed.

A package 10 includes a container 11, in accordance with the present disclosure, and a closure 100 configured to close an opening 26 formed in the container 11 as shown in FIG. 1. The container 11 includes an inner, reinforcement container-support frame 12 and an insulative, container shell 14 as shown in FIGS. 1 and 2. The container-support frame 12 establishes an interior product-storage region 16. Products, such as food products, may be placed in the interior product-storage region 16 and sealed inside of the interior region 16 of the container 11. In the illustrative embodiment, the container 11 is formed by an in-mold labeling process 200 from a foamed sheet that is trimmed to form a container-shell preform, and then thermoforming a second polymeric sheet a mold with the container-shell preform as shown in FIG. 5. During the process 200, the container shell preform bonds with the second polymeric sheet during thermoforming to form the container-shell support 12 once solidified and reinforce the container shell 14.

Figure 4:
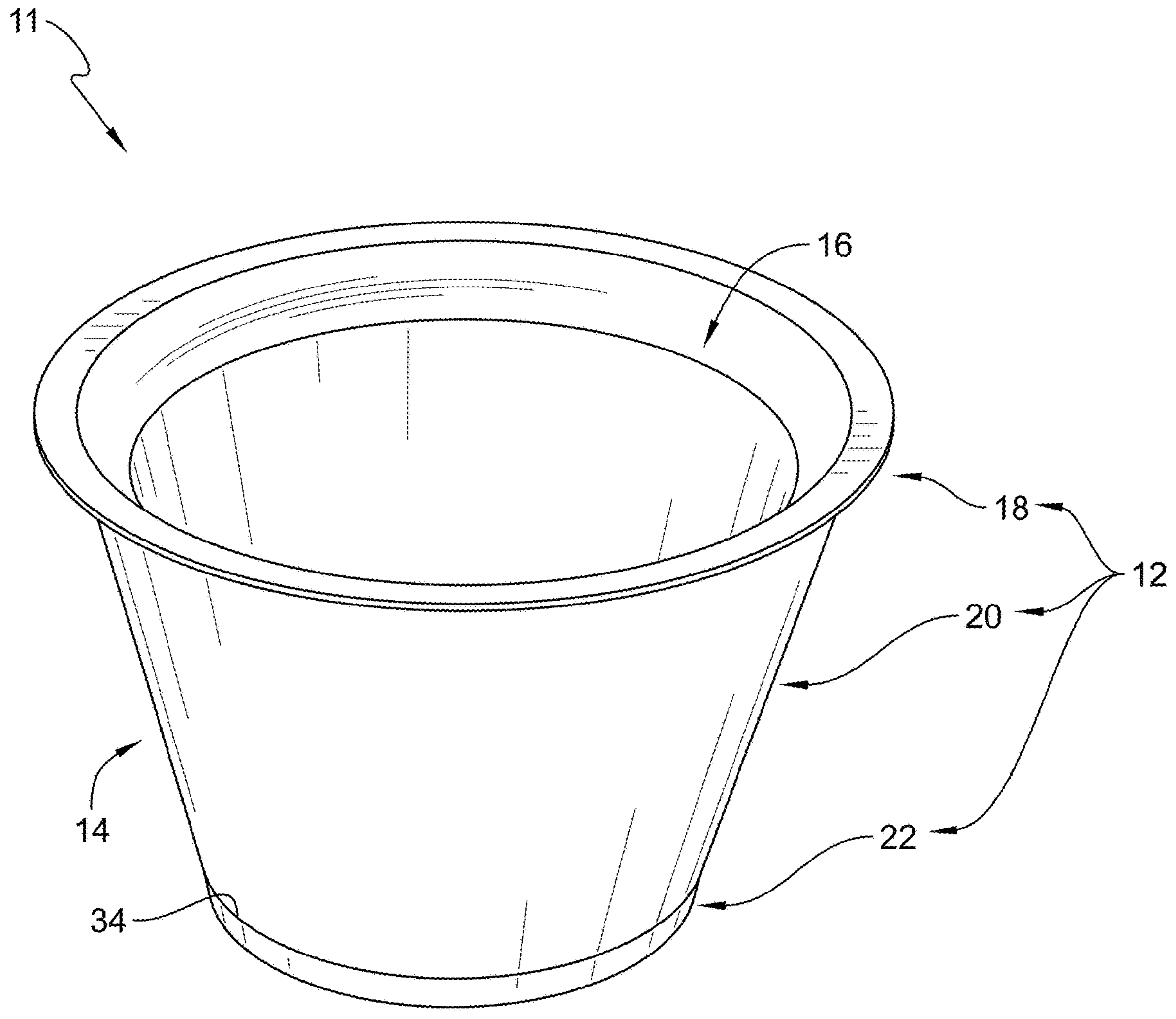
FIG. 4 is an perspective view of the insulative container showing that the container shell includes an upper end spaced apart from the brim and a lower end spaced apart from the floor.

The container-support frame 12 of the container 11 includes a brim 18, a side wall 20, and a floor 22 as shown in FIGS. 2 and 4. The brim 18 is annular and extends around a central axis 13 of the package 10 to provide an upper end of the container-support frame 12. The brim 18 defines the opening 26 into the interior region 16 of the container 11. The side wall 20 is annular and extends around the central axis 13. The side wall 20 also extends circumferentially around the central axis and extends vertically between and interconnects the brim 18 and the floor 22. The floor 22 is annular and extends around the central axis to provide a bottom end opposite the upper end of the container-support frame 12. Each of the brim 18, sidewall 20, and floor 22 is seamless.

The brim 18 of the container-support frame 12 borders the opening 26 into the interior region 16 of the container 11. The brim 18 is configured to mate with the closure 100 to seal the opening 26 of the container 11 and to seal the products contained in the interior region 16 therein. The brim 18 provides a constant sealing surface for the closure 100, which may comprise a film seal that is heat-sealed to the brim 18.

Figure 3:
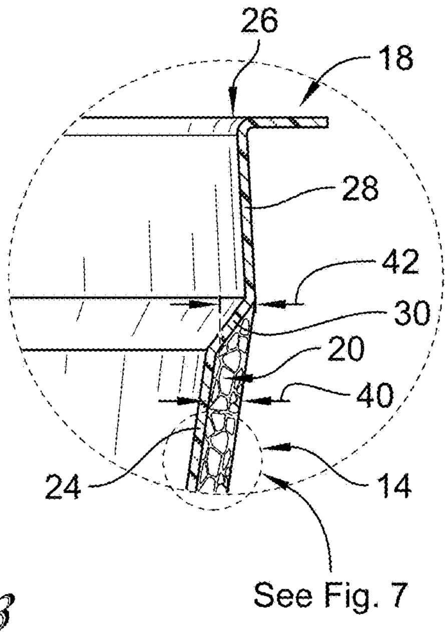
FIG. 3 is an enlarged portion of FIG. 1 showing that the container shell includes a foamed sheet having a lower density than the container-support frame.

The side wall 20 extends annularly around a central includes a lower sidewall segment 24 coupled to the floor 22, an upper sidewall segment 28 coupled to the brim 18, and a shoulder 30 coupled to an upper end of the lower sidewall segment 24 and a lower end of the upper sidewall segment 28 as shown in FIGS. 1-3. Each of the lower sidewall segment 24, the upper sidewall segment 28, and the shoulder 30 is tapered or angled relative to the central axis 13. The lower sidewall segment 24 is angled to extend outwardly away from the central axis 13 and away from the floor 22. The upper sidewall segment 28 is angled to extend toward the central axis 13 and away from the shoulder 30. The shoulder 30 is angled to extend outwardly away from the central axis 13 and from the upper end of the lower side wall segment 24. The angle of the shoulder 30 is less steep relative to the central axis 13 than the angle of the lower sidewall segment 24 and the angle of the upper sidewall segment 28. The shoulder 30 may provide a stack shoulder that is configured to engage a brim of a second container when stacked with the second container.

The container shell 14 is formed as a single panel or layer that extends annularly around the central axis 13 and the side wall 20 of the container-support frame 12 as shown in FIGS. 1 and 2. An inner surface 15 of the container shell 14 bonds with an outer surface 25 of the sidewall 20 during process 200 to provide an attachment interface between the container shell 14 and the container support frame 12 along an entire height defined between a top edge 32 and a bottom edge 34 of the container shell 14. In some embodiments, the top edge 32 of the container shell 14 abuts against and terminates at the shoulder 30 as shown in FIG. 3. In some embodiments, the bottom edge 34 of the container shell 14 terminates above the floor 22 to provide spacing therebetween. The container shell 14 forms a portion of an exterior sidewall of the container 11 in typical areas that a consumer grasps when using the container 11 such as when placing or removing the container 11 from a microwave. The container shell 14 provides insulation from heat for the consumer in this regard. In some embodiments, the container shell 14 may also surround all or portions of the upper sidewall segment 28, the brim 18, and/or the floor 22.

The container-support frame 12 is configured to reinforce the container shell 14 during filling of the container 11 with food or liquid products and when the container 11 is grasped by consumers, for example. The container-support frame 12 provides sufficient structural rigidity and strength so as not to deform substantially when being grasped by a consumer or puncture when brought into contact with eating utensils, for example. In the illustrative embodiment, the container-support frame 12 is thermoformed during the process 200 and is monolithic as a result of such process. In other embodiments, the container-support frame 12 may be blow molded, injection molded, or formed using any other suitable forming process.

The container shell 14 is a foamed non-aromatic polymeric material including polypropylene and/or other suitable polymeric materials, such as VERSALITE® manufactured by Berry Global, Inc., located at 101 Oakley Street, Evansville, IN. The container shell 14 may be formed by a process including thermoforming with in-mold labeling such that the container shell 14 includes a decorative film on the container-support frame 12. The material forming the container shell 14 is configured to withstand high temperatures and low temperatures and provide insulation therefrom. In one embodiment, the entire package 10 is recyclable so that the package can be reclaimed, reground, and reformed into other packages 10.

In the illustrative embodiment, the container-support frame 12 includes a first polymeric formulation and a first density. The container shell 14 includes a foamed sheet including a second polymeric formulation having a second density less than the first density. In some embodiments, the container-support frame 12 also has a greater rigidity and/or yield point compared to the container shell 14. In this way, the container-support frame 12 increases a rigidity of the container 11 while the container shell 14 increases thermal insulation of the container 11 so that the container can be gripped by a user without collapsing or fracturing the container shell 14 while the container shell 14 blocks transmission of heat to the user.

The first polymeric formulation and the second polymeric formulation each include at least one of polypropylene, polyethylene, and polyethylene terephthalate (PET), or another suitable material. In some embodiments, the first polymeric formulation consists of polypropylene and the second polymeric formulation is primarily polypropylene based (i.e. greater than 50%). In some embodiments, the container 11 consists of one or more non-aromatic polymeric materials. In some embodiments, the container 11 consists essentially of one or more non-aromatic polymeric materials. Containers consisting of or consisting essentially of polymeric materials are more recyclable than other containers that include both polymer materials and others (i.e. paper or cardboard) because it may be difficult to separate polymeric materials from those other materials during a recycling process.

The container shell 14 has a thickness 40 and the shoulder 30 has a radial span 42 that is about equal to the thickness 40 of the container shell 14 as shown in FIG. 3. In some embodiments, an outer surface 17 of the container shell 14 is flush with an upper end of the shoulder 30 so that the shoulder 30 is not visible from the exterior of the container 11. With reference to the thicknesses and distances discussed herein, the term about is used to account for minor manufacturing tolerances (i.e. 10%) that can occur while forming the container 11. For example, about equal can be within 10%.

In the illustrative embodiment the container shell 14 further includes a first circumferential end 44 and a second circumferential end 46. The first and second circumferential ends 44, 46 abut one another end-to-end after the container 11 is formed. In some embodiments, the first and second circumferential ends 44, 46 overlap one another to provide a layered seam. In such an embodiment, the container shell 14 may have the second density between the first circumferential end 44 and the second circumferential end 46, and the first circumferential end 44 and the second circumferential end 46 may each have a third density greater than the second density and less than the first density. In some embodiments, the container shell 14 is formed as a tube and is seamless.

The container shell 14 may compress in some areas as a result of thermoforming during the process 200 as shown in FIGS. 6 and 7. The container shell 14 may include an outer compressed region 50, an inner compressed region 52, and a middle region 54 between the outer and inner regions 50, 52. The outer region 50 has an outer-region density less than the first density of the container-support frame 12. The inner region 52 has an inner-region density less than the first density of the container-support frame 12. The middle region 54 has a middle-region density less than the first density of the container-support frame 12, the outer-region density, and the inner-region density. An average of the outer-region density, the inner-region density, and the middle region density may be the second density of the container shell 14.

The container 11 may be formed by process 200 including in-mold labeling to provide the container 11 with the container-support frame 12 for rigidity and the container shell 14 for insulation as shown in FIG. 5. The process 200 includes a step 202 of forming a foamed sheet 300 that is used during the process 200 to form the container shell 14. During the step 202, the first polymeric formulation is heated and extruded from an extruder 302. A blowing agent in the form of a liquefied inert gas may be introduced into the molten polymeric formulation. Blowing agent may be either a physical or a chemical material (or a combination of materials) that acts to expand nucleation sites. The blowing agent acts to reduce density by forming cells in the molten resin of the polymeric formulation when it is extruded. The foamed sheet 300 may initially be extruded in the form of a tube 304 and then slit to form the foamed sheet 300. In some embodiments, the foamed sheet 300 may be left in the form of the tube 304.

The step 202 also includes forming an unfoamed sheet 400 that is used to form the container-support frame 12. During the step 202, the second polymeric formulation is heated and extruded from an extruder 303. The unfoamed sheet 400 may initially be extruded in the form of a tube 305 and then slit to form the unfoamed sheet 400. While the sheets 300, 400 are illustrative shown to be extruded from separate extruders 302, 303 in the illustrative embodiment, the sheets 300, 400 may be extruded from the same extruder at different times from one another.

The process 200 may include a step 204 of laminating one or both of the foamed sheet 300 and the unfoamed sheet 400 with a skin 306 to provide a multi-layer sheet 301, 401 that is used to form the container shell 14. In the illustrative embodiment, the unfoamed sheet 400 is laminated with the skin 306 to provide multi-layer sheet 401 including the unfoamed sheet 400 and one or more films and/or decoration on one or both sides of the foamed sheet, for example. In the illustrative embodiment, the foamed sheet 300 may also be laminated with the skin 306 to provide multi-layer sheet 301 including the foamed sheet 300 and one or more films and/or decoration on one or both sides of the foamed sheet, for example.

The skin 306 can include one or more layers of different materials depending on the sheet 300, 400 that it is applied to. In one example, the skin 306 is laminated on an interior surface the unfoamed sheet 400 to border the interior region 16 and includes a barrier layer suitable for contact with food products and configured to block ingress of moisture and air. In another example, the skin 306 is laminated on an outer surface the unfoamed sheet 400 and includes a film layer and ink to provide decoration. In another example, the skin 306 is laminated on an outer surface the foamed sheet 300 and includes a film layer and an ink layer printed on the film layer. The film layer may be located between the foamed sheet and the ink layer.

In some embodiments, a polymeric lamination layer 308 can be extruded between the outer skin 306 and the sheet(s) 300, 400 to bond the skin 306 to the sheet(s) 300, 400 during step 204. In some embodiments, the skin 306 can include a barrier layer and one or more tie layers. For example, the skin 306 can have, in order, the polymeric-lamination layer 308 coupled to the unfoamed sheet 400, a tie layer, the barrier layer, a second tie layer, and an inner film layer. In such an example, the polymeric-lamination layer 308 and the inner film layer can include the same material(s), such as polypropylene.

The process 200 further includes a step 206 of trimming the foamed sheet 300 (or the multi-layer sheet 301) to provide a shell preform 314 and trimming the unfoamed sheet 400 (or the multi-layer sheet 401) to provide a frame preform 312. The sheets 300, 400 and/or the multi-layer sheets 301, 401 may consist of non-aromatic, polymeric materials to increase recyclability so that unused portions of the sheets can be reclaimed and reused to form another sheet.

The process 200 further includes a step 208 of inserting the shell preform 314 into a mold cavity 311 of a mold 310. Once inserted, the shell preform 314 lines side surfaces of the mold cavity 312.

The process 200 further includes a step 210 of covering an opening into the mold cavity 311 with the frame preform 312 and thermoforming the frame preform 312 with the container preform 314 in the mold cavity 312. The step 210 includes applying positive or negative pressure to the mold cavity 311 to form the container 11. During the step 210 of thermoforming, an inner surface of the shell preform 314 is bonded with an outer surface of the frame preform 312. During the step 210 of thermoforming, the shell preform 314 compresses to provide the container shell 14 with the outer-region density, an inner-region density, and a middle-region density. The shell preform 314 may compress to about 50-80% of an initial thickness of the shell preform 314 prior to the step 210. In one example, the preform 314 compresses to about 60% of the initial thickness of the shell preform 314 prior to the step 210. The process 200 further includes heat sealing the closure 100 to the container 11 after the container 11 is filled with a product.

The container shell 14 may be formed from a foamed multi-layer sheet of insulative cellular non-aromatic polymeric material that includes, for example, a strip of insulative cellular non-aromatic polymeric material and printed film layer coupled to one side of the strip of insulative cellular non-aromatic polymeric material. In one embodiment of the present disclosure, text and artwork or both can be printed on a film included in printed film layer. In some embodiments, the ink layer is applied to the film to locate the ink layer between the film and the strip of insulative cellular non-aromatic polymeric material. In another embodiment, the ink layer is applied to the film to locate film layer between the ink layer and the strip of insulative cellular non-aromatic polymeric material. As an example, the film layer may comprise biaxially oriented polypropylene (BOPP).

As an example, a polymeric formulation for forming insulative cellular non-aromatic polymeric material comprises a base resin blend comprising at least one high melt strength polypropylene and a polypropylene copolymer or homopolymer (or both). In some embodiments, the formulation may comprise cell-forming agents including a chemical nucleating agent, a physical nucleating agent, a physical blowing agent such as carbon dioxide, or a combination thereof. As a further example, insulative cellular non-aromatic polymeric material further comprises a slip agent. As an example, at least one polypropylene resin may have a broadly distributed unimodal (not bimodal) molecular weight distribution.

In some embodiments, the foamed multi-layer sheet has a puncture resistance, as measured in max load for either a ¼" probe or a ⅛" probe. In some embodiments, the puncture resistance for foamed multi-layer sheet (max load) is at least about 1,000 gf, at least about 3,000 gf, at least about 6,000 gf, at least about 8,000 gf, at least about 9,000 gf, or at least about 9,500 gf. In some embodiments, the puncture resistance for foamed multi-layer sheet 80 (max load) is less than about 20,000 gf, less than about 18,000 gf, less than about 12,000 gf, or less than about 10,000 gf. In some embodiments, the puncture resistance for foamed multi-layer sheet (max load) is in a range of about 1,000 gf to about 20,000 gf, about 1,000 gf to about 18,000 gf, about 1,000 gf to about 12,000 gf, about 3,000 gf to about 12,000 gf, about 6,000 gf to about 12,000 gf, about 7,000 gf to about 12,000 gf, about 7,000 gf to about 11,000 gf, about 8,000 gf to about 11,000 gf, about 8,000 gf to about 10,000 gf, or about 9,000 gf to about 10,000 gf.

In some embodiments, the foamed multi-layer sheet or insulative cellular non-aromatic polymeric material has a thermal conductivity at 21° C. In some embodiments, the thermal conductivity at 21° C. is at least about 0.05 W/m-K or at least about 0.052 W/m-K. In some embodiments, the thermal conductivity at 21° C. is less than about 0.06 W/m-K, less than about 0.057 W/m-K, less than about 0.056 W/m-K, or less than about 0.053 W/m-K. In some embodiments, the foamed multi-layer sheet or insulative cellular non-aromatic polymeric material has a thermal conductivity at 21° C. in a range of about 0.05 W/m-K to about 0.06 W/m-K, about 0.05 W/m-K to about 0.059 W/m-K, about 0.052 W/m-K to about 0.059 W/m-K, or about 0.054 W/m-K to about 0.057 W/m-K.

In some embodiments, the foamed multi-layer sheet or insulative cellular non-aromatic polymeric material has a thermal conductivity at 93° C. In some embodiments, the thermal conductivity at 93° C. is at least about 0.061 W/m-K or at least about 0.062 W/m-K. In some embodiments, the thermal conductivity at 93° C. is less than about 0.065 W/m-K, less than about 0.064 W/m-K, or less than about 0.0642 W/m-K. In some embodiments, the foamed multi-layer sheet or insulative cellular non-aromatic polymeric material has a thermal conductivity at 93° C. in a range of about 0.061 W/m-K to about 0.065 W/m-K, about 0.063 W/m-K to about 0.065 W/m-K, about 0.063 W/m-K to about 0.0645 W/m-K.

In some embodiments, the foamed multi-layer sheet or insulative cellular non-aromatic polymeric material was tested using the Elmendorf test method described in ASTM D1922-93. In some embodiments, the Elmendorf Arm machine direction (MD) for the insulative cellular non-aromatic polymeric material is at least about 500 g. In some embodiments, the Elmendorf Arm MD for foamed multi-layer sheet is at least about 1500 g. In some embodiments, the Elmendorf Arm MD for container 11 is at least about 1500 g. In some embodiments, the Elmendorf Arm TD for insulative cellular non-aromatic polymeric material is at least about 500 g. In some embodiments, the Elmendorf Arm TD for foamed multi-layer sheet is at least about 1500 g. In some embodiments, the Elmendorf Arm TD for container 11 is at least about 1500 g.

It is within the scope of the present disclosure that the density of the foamed multi-layer sheet be up to about 0.25 g/cm3, up to about 0.2 g/cm3, up to about 0.18 g/cm3, up to about 0.16 g/cm3, up to about 0.14 g/cm3, up to about 0.13 g/cm3, or up to about 0.12 g/cm3. In some embodiments, the density of the foamed multi-layer sheet is less than about 0.2 g/cm3, less than about 0.18 g/cm3, less than about 0.16 g/cm3, less than about 0.15 g/cm3, less than about 0.14 g/cm3, or less than about 0.13 g/cm3. The density of the foamed multi-layer sheet may be about 0.01 g/cm3, about 0.03 g/cm3, about 0.05 g/cm3, about 0.06 g/cm3, about 0.07 g/cm3, about 0.08 g/cm3, about 0.09 g/cm3, about 0.1 g/cm3, about 0.11 g/cm3, about 0.12 g/cm3, about 0.13 g/cm3, about 0.14 g/cm3, about 0.15 g/cm3, about 0.16 g/cm3, about 0.18 g/cm3, about 0.2 g/cm3, or about 0.25 g/cm3. In a set of ranges, the density of the foamed multi-layer sheet is one of the following ranges: about 0.01 g/cm3 to about 0.2 g/cm3, about 0.05 g/cm3 to about 0.19 g/cm3, about 0.05 g/cm3 to about 0.18 g/cm3, about 0.05 g/cm3 to about 0.17 g/cm3, about 0.1 g/cm3 to about 0.17 g/cm3, about 0.11 g/cm3 to about 0.17 g/cm3, or about 0.12 g/cm3 to about 0.16 g/cm3.

In some embodiments, the foamed multi-layer sheet or insulative cellular non-aromatic polymeric material was tested using the Elmendorf test method described in ASTM D1922-93. In some embodiments, the Elmendorf Tear MD for the foamed multi-layer sheet or insulative cellular non-aromatic polymeric material is at least about 75 gf. In some embodiments, the Elmendorf Tear MD for the foamed multi-layer sheet or insulative cellular non-aromatic polymeric material is less than about 350 gf. In some embodiments, the Elmendorf Tear MD for the foamed multi-layer sheet is at least about 65 gf. In some embodiments, the Elmendorf Tear MD for foamed multi-layer sheet is less than about 700 gf. In some embodiments, the Elmendorf Tear MD for foamed multi-layer sheet is at least about 125 gf, at least about 200 gf, at least about 300 gf, or at least about 400 gf. In some embodiments, the Elmendorf Tear MD for foamed multi-layer sheet is less than about 700 gf, less than about 600 gf, less than about 500 gf. In some embodiments, the Elmendorf Tear MD for foamed multi-layer sheet is in a range of about 200 gf to about 700 gf, about 200 gf to about 600 gf, about 200 gf to about 500 gf, or about 300 gf to about 500 gf.

In some embodiments, the Elmendorf Tear transverse direction (TD) for foamed multi-layer sheet is at least about 10 gf, at least about 50 gf, or at least about 125 gf. In some embodiments, the Elmendorf Tear TD for insulative cellular non-aromatic polymeric material is less than about 450 gf. In some embodiments, the Elmendorf Tear TD for foamed multi-layer sheet is at least about 65 gf, at least about 100 gf, or at least about 200 gf. In some embodiments, the Elmendorf Tear TD for foamed multi-layer sheet is less than about 600 gf. In some embodiments, the Elmendorf Tear TD for foamed multi-layer sheet is at least about 200 gf, at least about 300 gf, or at least about 400 gf. In some embodiments, the Elmendorf Tear TD for foamed multi-layer sheet is less than about 700 gf, less than about 650 gf, or less than about 550 gf. In some embodiments, the Elmendorf Tear TD of container 11 is about 200 gf to about 700 gf, about 200 gf to about 600 gf, or about 300 gf to about 600 gf.

In exemplary embodiments, a polymeric formulation comprises a base resin blend comprising at least two materials. In some embodiments, the base resin blend comprises a first polymer and a second polymer. In some embodiments, the first polymer is a polypropylene. In some embodiments, the second polymer is a polypropylene. In some embodiments, the first polymer is a polypropylene and the second polymer is a polypropylene. In one exemplary embodiment, a first or second polypropylene polymer comprises a high melt strength polypropylene that has long chain branching. In one exemplary embodiment, the first or second polypropylene polymer also has non-uniform dispersity. In some embodiments, the first polypropylene polymer is a polypropylene homopolymer. In some embodiments, the second polypropylene is a polypropylene homopolymer. In some embodiments, the base resin blend comprises a first polypropylene homopolymer and a second polypropylene homopolymer.

In some embodiments, the base resin blend further comprises a third material. In some embodiments, the base resin blend comprises at least two high melt-strength polypropylenes. In some embodiments, the base resin blend comprises a first high melt-strength polypropylene, a second high melt-strength polypropylene, and a polypropylene copolymer. In some embodiments, the polypropylene copolymer is a high-crystallinity copolymer.

In some exemplary embodiments, the base resin blend may comprise polyethylene. In exemplary embodiments, the base resin blend may comprise low-density polyethylene, linear low-density polyethylene, high-density polyethylene, ethylene-vinyl acetate copolymers, ethylene-ethylacrylate copolymers, ethylene-acrylic acid copolymers, polymethylmethacrylate mixtures of at least two of the foregoing and the like. The use of non-polypropylene materials may affect recyclability, insulation, microwavability, impact resistance, or other properties.

It is within the scope of the present disclosure to select an amount of base resin blend of the polymeric formulation to be one of the following values: about 40%, about 45%, about 50%, about 55%, about 60%, about 65%, about 70%, about 75%, about 80%, about 85%, about 86%, about 87%, about 88%, about 89%, about 90%, about 91%, about 92%, about 93%, about 94%, about 95%, about 96%, about 97%, about 98%, about 99%, about 99.5%, and about 99.9% by weight of the polymeric formulation. It is within the present disclosure for the amount of base resin blend in the polymeric formulation to fall within one of many different ranges. In a first set of ranges, the range of base resin blend of the polymeric formulation is one of the following ranges: about 40% to about 99.9%, about 70% to about 99.9%, about 80% to about 99.9%, about 85% to about 99.9%, about 90% to about 99.9%, about 95% to about 99.9%, about 98% to about 99.9%, and about 99% to about 99.9% by weight of the polymeric formulation. In a second set of ranges, the range of base resin blend in the polymeric formulation is one of the following ranges: about 85% to about 99%, about 85% to about 98%, about 85% to about 95%, and about 85% to about 90% by weight of the polymeric formulation. In a third set of ranges, the range of base resin blend of the polymeric formulation is one of the following ranges: about 40% to about 99%, about 40% to about 95%, about 40% to about 85%, about 45% to about 85%, about 40% to about 80%, about 50% to about 80%, about 55% to about 80%, and about 60% to about 80% by weight of the polymeric formulation.

It is within the scope of the present disclosure to select an amount of the first polymer of the base resin blend to be one of the following values: about 30%, about 35%, about 40%, about 41%, about 42%, about 43%, about 44%, about 45%, about 50%, about 50%, about 55%, about 60%, about 65%, about 70%, about 75%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, or about 99% by weight of the base resin blend. It is within the present disclosure for the amount of the first polymer of the base resin blend to fall within one of many different ranges. In a first set of ranges, the range of first polymer in the base resin blend is one of the following ranges: about 30% to about 99%, about 40% to about 99%, about 50% to about 99%, about 60% to about 99%, about 70% to about 99%, about 80% to about 99%, or about 85% to about 99.9% by weight of the base resin blend. In a second set of ranges, the range of first polymer in the base resin blend is one of the following ranges: about 40% to about 97%, about 40% to about 95%, about 40% to about 92%, or about 40% to about 90% by weight of the base resin blend. In a third set of ranges, the range of first polymer in the base resin blend is one of the following ranges: about 40% to about 95%, about 40% to about 90%, about 40% to about 80%, about 40% to about 70%, about 45% to about 70%, about 45% to about 60%, about 50% to about 95%, about 60% to about 95%, about 65% to about 95%, about 65% to about 92%, about 70% to about 92%, about 75% to about 92%, or about 80% to about 92% by weight of the base resin blend.

In illustrative embodiments, the base resin blend includes a second polymer. In some embodiments, the second polymer is a polyethylene. In some embodiments, the second polymer is a polypropylene. In some embodiments, the second polypropylene is a second polypropylene homopolymer. In some embodiments, the second polypropylene is a second polypropylene copolymer. In some embodiments, the second polypropylene is a second high melt-strength polypropylene. It is within the scope of the present disclosure to select an amount of the second polymer of the base resin blend to be one of the following values: about 1%, about 2%, about 3%, about 4%, about 5%, about 6%, about 7%, about 8%, about 9%, about 10%, about 11%, about 12%, about 13%, about 14%, about 15%, about 20%, about 25%, about 30%, about 35%, about 36%, about 37%, about 38%, about 39%, about 40%, about 41%, about 42%, about 43%, about 44%, about 45%, about 50%, or about 60% by weight of the base resin blend. It is within the present disclosure for an amount of the second polymer of the base resin blend to fall within one of many different ranges. In a first set of ranges, the range of base resin is one of the following ranges: about 1% to about 60%, about 1% to about 50%, about 1% to about 40%, about 1% to about 30%, about 1% to about 25%, about 1% to about 20%, about 1% to about 15%, about 1% to about 10%, or about 1% to about 5% by weight of the base resin blend. In a second set of ranges, the range of the second polymer of the base resin blend is one of the following ranges: about 1% to about 50%, about 10% to about 60%, about 15% to about 60%, about 20% to about 60%, about 30% to about 60%, about 35% to about 60%, or about 40% to about 60% by weight of the base resin blend. In a third set of ranges, the range of second polymer of the base resin blend is one of the following ranges: about 2% to about 60%, about 2% to about 50%, about 10% to about 50%, about 15% to about 50%, about 20% to about 50%, about 25% to about 50%, about 25% to about 45%, about 2% to about 40%, about 2% to about 30%, about 4% to about 30%, about 4% to about 25%, about 4% to about 20%, about 5% to about 20%, about 5% to about 20%, or about 5% to about 15% by weight of the base resin blend. In an embodiment, the base resin blend lacks a second polymer. In a particular embodiment, a second polypropylene can be a high crystalline polypropylene homopolymer.

In illustrative embodiments, the base resin blend includes a third polymer. In some embodiments, the third polymer is a polyethylene. In some embodiments, the third polymer is a polypropylene. In some embodiments, the third polypropylene is a polypropylene homopolymer. In some embodiments, the third polypropylene is a polypropylene copolymer. In some embodiments, the third polypropylene is a high crystallinity polypropylene copolymer. It is within the scope of the present disclosure to select an amount of the third polymer of the base resin blend to be one of the following values: about 1%, about 2%, about 3%, about 4%, about 5%, about 6%, about 7%, about 8%, about 9%, about 10%, about 11%, about 12%, about 13%, about 14%, about 15%, about 20%, about 25%, about 30%, or about 35% by weight of the base resin blend. It is within the present disclosure for an amount of the third polymer of the base resin blend to fall within one of many different ranges. In a first set of ranges, the range of base resin is one of the following ranges: about 1% to about 35%, about 1% to about 30%, about 1% to about 25%, about 1% to about 20%, about 1% to about 15%, about 1% to about 10%, or about 1% to about 8% by weight of the base resin blend. In a second set of ranges, the range of the third polymer of the base resin blend is one of the following ranges: about 2% to about 35%, about 3% to about 35%, about 4% to about 35%, about 5% to about 35%, about 6% to about 35%, about 7% to about 35%, or about 8% to about 35% by weight of the base resin blend. In a third set of ranges, the range of third polymer of the base resin blend is one of the following ranges: about 1% to about 25%, about 2% to about 25%, about 2% to about 20%, about 3% to about 20%, about 4% to about 20%, about 4% to about 15%, about 5% to about 15%, or about 5% to about 10% by weight of the base resin blend. In an embodiment, the base resin blend lacks a third polymer. In a particular embodiment, the third polymer can be a high crystalline polypropylene.

The invention claimed is:

1. An insulative container comprising a container-support frame defining an interior product storage space and including a brim defining an open mouth opening into the product storage space, a floor spaced apart vertically from the brim and closing a lower end of the insulative container to provide a bottom of the interior product storage space, and a sidewall extending between and interconnecting the brim and the floor to define the interior product storage space above the floor and inward of the sidewall, and a container shell bonded with an outer surface of the sidewall to reside vertically between the brim and the floor and provide an attachment interface between container shell and the sidewall of the container-support frame from a lower edge of the container shell to an upper edge of the container shell, wherein the container-support frame includes a first polymeric formulation and a first density and the container shell includes a second polymeric formulation having a second density less than the first density, wherein the sidewall of the container-support frame includes a lower sidewall segment coupled to the floor, an upper sidewall segment coupled to the brim, and a shoulder coupled to an upper end of the lower sidewall segment and a lower end of the upper sidewall segment, and wherein the container shell has an upper end that terminates at the shoulder, and wherein the container shell has a thickness and the shoulder has a radial span that is about equal to the thickness of the container shell such that the upper end of the container shell is flush with an outer surface of the upper sidewall segment of the container-support frame.

2. The insulative container of claim 1, wherein the first polymeric formulation and the second polymeric formulation each include polypropylene.

3. The insulative container of claim 1, wherein the shoulder extends radially outward away from the upper end of the lower sidewall segment to the lower end of the upper sidewall segment at an inclined, positive angle relative to the central axis and the upper sidewall segment extends radially inward toward the central axis and away from the shoulder at an inclined, negative angle so that the shoulder provides a stack shoulder that is configured to engage a brim of a second container when stacked with the second container.

4. The insulative container of claim 1, wherein the container shell has a lower end spaced apart from the floor.

5. The insulative container of claim 1, wherein the second density is an average density of the container shell and the average density includes an outer-region density less than the first density, an inner-region density less than the first density, and middle-region density less than the first density, the outer-region density, and the inner-region density.

6. The insulative container of claim 1, wherein the container shell includes a foamed sheet, and the foamed sheet and the container-support frame each consist essentially of one or more polymeric materials.

7. The insulative container of claim 6, wherein the foamed sheet and the container-support frame each consist essentially of polypropylene.

8. The insulative container of claim 7, further comprising an outer skin laminated on an outer surface of the foamed sheet.

9. The insulative container of claim 8, wherein the outer skin includes a film layer and ink printed on the film layer.

10. The insulative container of claim 1, wherein the sidewall of the container-support frame has a second thickness less than the thickness of the container shell.

* * * * *